Aug. 27, 1963 W. C. SANDERS 3,101,987
DRIVE-YOURSELF MOTOR VEHICLE CONTRACT AND KEY RECOVERY DEVICE
Filed Feb. 23, 1961 2 Sheets-Sheet 2
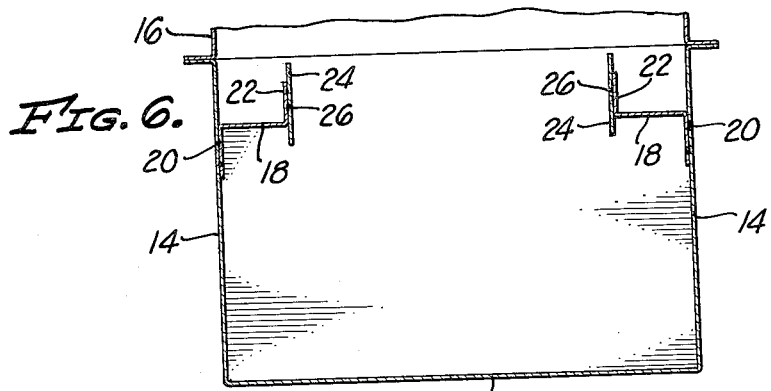
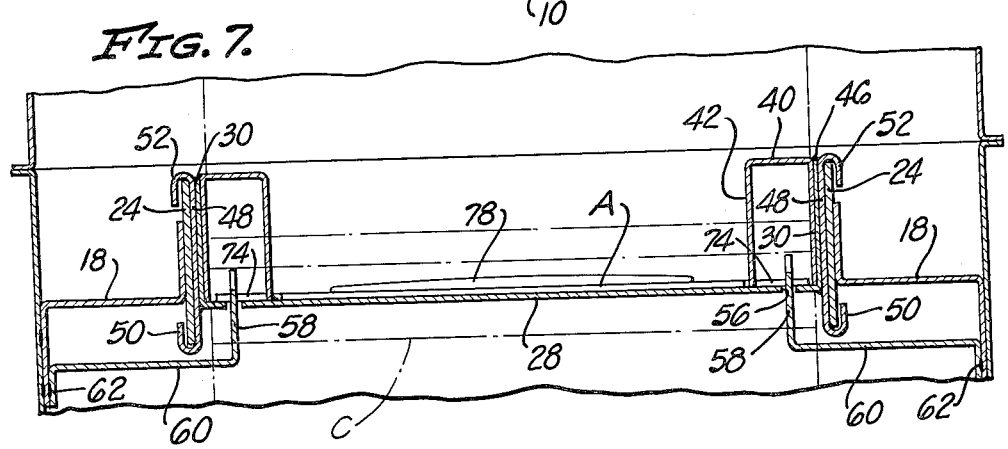
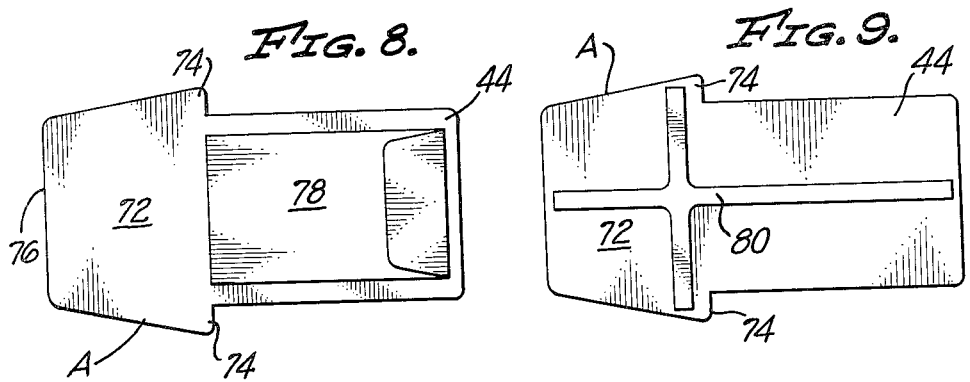
INVENTOR.
WALTER C. SANDERS
BY
HERBERT C. SCHULZE
ATTORNEY

United States Patent Office 3,101,987
Patented Aug. 27, 1963

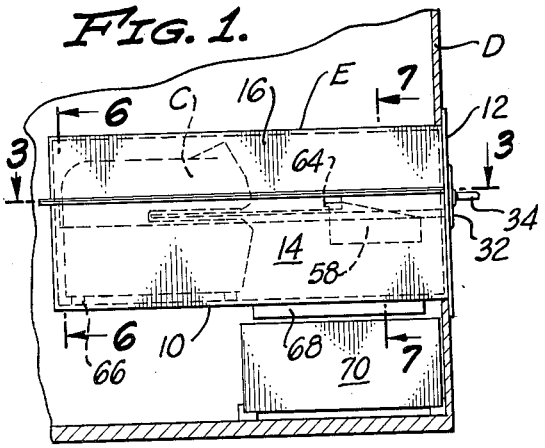
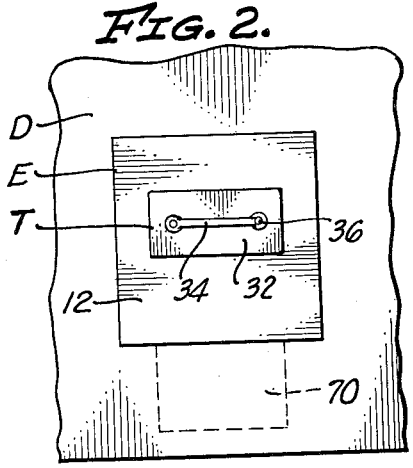
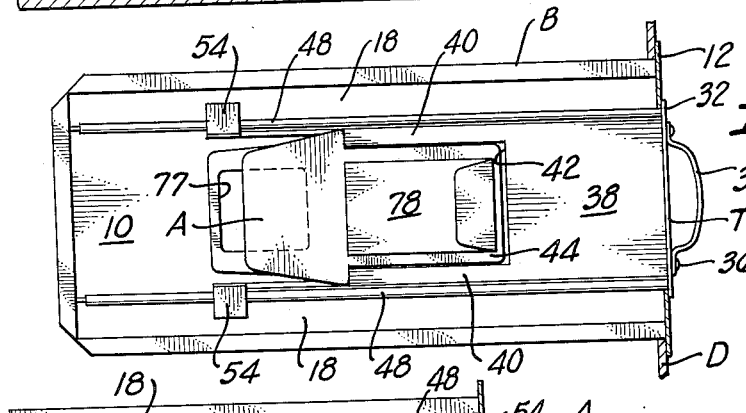
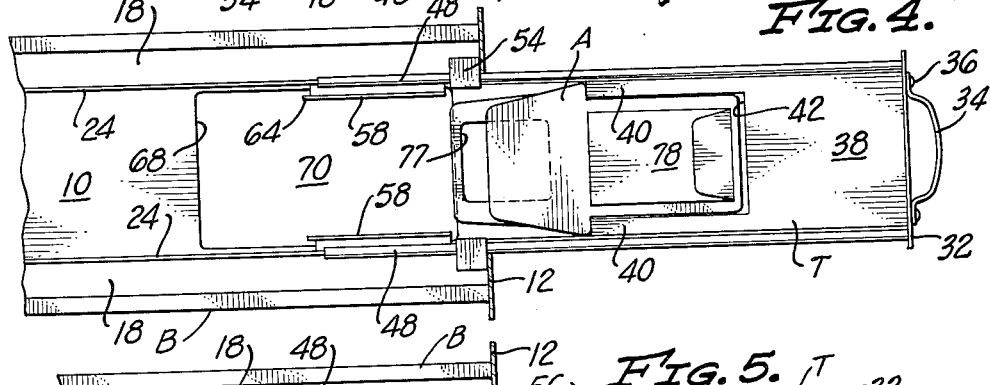
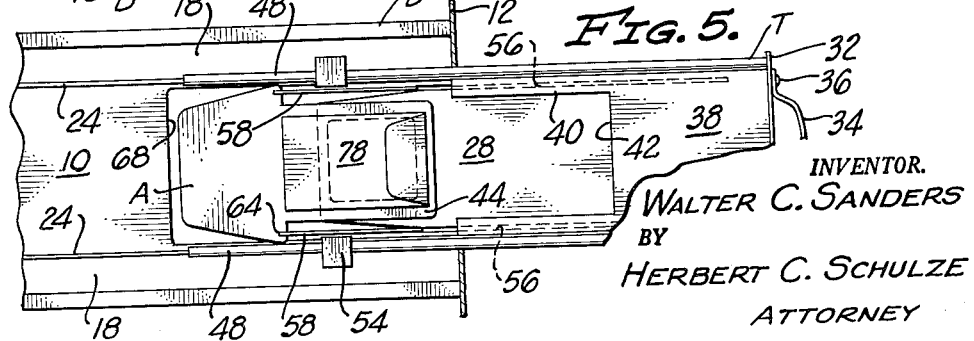

3,101,987
DRIVE-YOURSELF MOTOR VEHICLE CONTRACT
AND KEY RECOVERY DEVICE
Walter C. Sanders, 3924 La Hacienda Drive,
San Bernardino, Calif.
Filed Feb. 23, 1961, Ser. No. 91,257
2 Claims. (Cl. 346—20)

This invention relates generally to recovery devices such as drive-yourself motor vehicle contracts and specifically to manually operated mechanism adapted to receive the contract and vehicle key and thereafter automatically time and store the elements securely for later consideration.

One object of this invention is to provide a drive-yourself contract and key recovery and timing device that will permit the delivery of a motor vehicle directly to a station where no attendant is present.

The business of leasing drive-yourself motor vehicles and trucks is well known and used almost universally throughout the various continents. The motor vehicle leasing contract is based primarily on a time basis and mileage. It is relatively easy to compute the mileage as indicated by the speedometer reading at time of departure and return. It is more difficult to insure exact hour and date of motor vehicle return unless an attendant is on duty. Many of the renting or leasing stations are small and it is not possible to have an attendant on duty at all hours. Many trucks or cars are leased during the day and returned at night. Heretofore, it has been customary to direct leased vehicles, when returned at night, to all-night service stations or garages. The leasing contract and vehicle keys are received and timed by attendants with moderate competence and little interest. The lessee usually must find his way back to the leasing station to pick up his personal car. The motor vehicle delivered at night some distance from the leasing station when no attendant is on duty must be returned in the morning. There are other difficulties attending the night or weekend return delivery of leased motor vehicles which are completely overcome by the device of the present invention.

It is another object of the invention to provide a renting or leasing contract and key recovery, timing and storing device that will permit delivery of the motor vehicle directly to a leasing station, hotel or any convenient place predetermined without the necessity of an attendant being present.

Still another object of the invention is in the provision of an after-hour lease recovery and timing device that obviates any possibility of falsification thereof by immediate securement and storing of the contract.

Yet another object of the invention lies in the use of a special contract and key receiving card or member adapted to be manually presented by the lessee to a timing device, whereupon the contract and key will be automatically retrieved and stored for later disposition.

A further object of the invention lies in a device for time recording and storing a drive-yourself lease contract and key that is manually presented thereto by a lessee upon return of a motor vehicle to a station after normal operating hours.

A still further object of the invention is in the provision of a tray type lease and key attached card receiving device that presents the card to a timing device on inward movement and releases the card to stored position on outward manual actuation.

The foregoing and other objects and advantages of the invention will be readily understood by those skilled in the art by reference to the attached description when read in conjunction with the attached drawings, in which:

FIGURE 1 is a side elevational view in vertical section of a preferred embodiment of the invention;
FIGURE 2 is a front elevational view of FIGURE 1;
FIGURE 3 is a sectional view taken on the line 3—3 of FIGURE 1;
FIGURE 4 is a view similar to FIGURE 3 with the card receiving tray in full outward position;
FIGURE 5 is a view similar to FIGURE 4 with the tray moved slightly inward;
FIGURE 6 is a sectional view taken on the line 6—6 of FIGURE 1;
FIGURE 7 is a sectional view taken on the line 7—7 of FIGURE 1;
FIGURE 8 is a plan view from above of the contract and key receiving card; and
FIGURE 9 is a plan view from below of the card of FIGURE 8.

A business such as the leasing of drive-yourself motor vehicles and trucks is well known. An attendant fills out the terms of the leasing contract. He then checks the motor vehicle mileage and indicates same and out time on the agreement. The contract is signed by the user and a financial deposit or some billing arrangement is made. The motor vehicle or truck key is then handed to the driver. The leasing agreement is always based on time and mileage has begun. The driver of the leased vehicle uses it for any desired purpose and then returns the vehicle to the original or some other station of the parent company. The motor vehicles are returned at all hours of the day or night and at various locations. It is absolutely essential for proper accounting that the exact time of return be placed on the contract. (The return of the vehicle keys grounds the vehicle with the exact mileage disclosed.) The motor vehicle mileage use can thus be easily computed on the contract at a later time.

The major difficulties of after-hour return of drive-yourself motor vehicles and trucks are overcome by the device of the present invention as disclosed herein. The mechanism comprises a special card or member A; as shown in FIGURES 8 and 9. The card A has a conventional envelope secured thereto for receiving the users leasing agreement and car keys. This card is provided at any of the stations. At each station of the parent leasing company, a recovery and timing device adapted to receive the cards A is provided. These devices include generally a tray type card receiving and storing mechanism B which has a conventional electrical time and date clock C operatively supported therein. The tray type card receiving device B is housed in a wall or cabinet at the station in such manner that the only mechanism susceptible of exterior manipulation or use is a partially withdrawable tray and handle therefor. It is immediately apparent that the driver of the leased motor vehicle or truck, upon return thereof, merely pulls out the tray of the device B. He then places the special card A with contained contract and key in the tray and moves the tray to a closed position. The card A is forced into the time clock and the return time stamped thereon. As will be later described, a succeeding driver when withdrawing the tray will cause the prior card A to drop downwardly to a stored position ready for computation by an attendant when returning for duty. The matter of final accounting and payment is carried out in the usual manner.

Referring specifically to the drawings wherein a preferred embodiment is disclosed, a cabinet D of wood, metal or plastic has secured thereto an inner metal box E having a bottom or base 10 and a front wall 12. Box side walls are indicated at 14 and a top at 16. The cabinet and box may be formed as a separate unit with exterior tray exposure or may become a part of a wall in the leasing station itself. It is merely necessary that exterior manual actuation of a card receiving tray be permitted.

The metal box E disclosed in the drawings has a pair of spaced longitudinally disposed flanged metal supports 18 welded thereto at 20. The vertically disposed inner ends 22 of the supports 18 have identical spaced tray supports 24 connected or welded thereto at 26.

A card receiving tray generally referred to as T has a bottom 28 and side walls 30. A front wall 32 of the shallow tray T overlaps the adjacent edges of the box wall 12 in conventional manner. A handle 34 is attached at 36 to the wall 32. The shallow card receiving tray T has an inner metal cover 38 near its outer or handle end. The tray cover 38 has rearwardly projecting covered legs or bifurcated portions 40 which provides a trough 42 designed to receive snugly the rectangular shaped tail end 44 of the special card A. The legs 40 merely extend toward the inner end of the tray as shown in the various figures and provide a fixed seat for the card A. Welded at 46 to the sides 30 of the tray T are longitudinally disposed tray guides 48 having upwardly and downwardly turned portions 50 and 52, respectively, that slide on the spaced vertical tray supports 24. Spaced laterally disposed tray stops 54 prevent complete withdrawal of the tray T by abutment against the inner face of the front box wall 12.

The bottom 28 of the tray T has spaced longitudinally disposed parallel slits 56 therein as shown clearly in FIGURE 7. As shown in FIGURES 1 and 7, spaced vertically disposed ramps 58 project upwardly through the slits 56 in the tray bottom 28. The ramps 58 are supported inwardly from the box side walls 14 by integral bent metal angles 60 welded at 62 to the tray supports 18. The ramps 58 emerge from and slant rearwardly and upwardly through the slits 56. The upper narrow edges 64 of the ramps 58 project rearwardly in an overhanging manner to form card locking and extracting means as will be later described.

A conventional automatic electric time clock C is fixedly supported at 66 on the bottom 10 of the metal box E. The box bottom 10 is also opened at 68 near its forward end to permit dropping of special cards A therethrough and into a card container 70 in the cabinet D.

The special card A as shown in the drawings may be made of cardboard, plastic or other suitable material. The card A has a flat headed arrow shaped time recording forward end 72. The arrow shaped end 72 of the card A has dual spaced ears 74 projecting laterally beyond the rectangular shaped shank or tail 44 for engagement with the spaced ramps 58 and beneath projection 64 after the tray T and card A have been thrust to their extreme inner position. At that time the forward edge 76 of the card end 72 is between the jaws of the time clock and indication of motor vehicle return time is being recorded. An opening 77 in the tray permits the striker of the clock C to operate in a normal manner.

The special card A has a contract and key receiving envelope 78 adhesively secured thereto on its upper face. The card A may be reinforced at 80 if cardboard is used.

The operation of the device is relatively simple. The lesee or driver upon return of the motor vehicle or truck to the original or any other station of the parent company places his contract and car key in the envelope 78 of the special card A. He then places the card A in the trough 42 of the tray T which he has withdrawn to its outermost position. The ears 74 of the card A rest against the forward edges of the legs 40 in the tray T. The tray is then moved inwardly and the card A is forced upon the spaced ramp portions 58. As the tray approaches final inner position, the forward edge 76 of the card A has dropped into position to be engaged with the time clock C and vehicle return time is stamped thereon. The arrowhead end 72 of the card A has passed beyond the spaced ramps 58 and the ears 74 have dropped below the projecting edges 64 thereof. The time recorded card A remains in this position until a succeeding vehicle user withdraws the tray T for placement of a new card A thereon. Upon withdrawal of the tray, the card ears 74 are held against rearward movement by the ramps 58 and when the tray T has been withdrawn from beneath card A, it drops downwardly through the opening 68 into the container 70. The stored cards are computed the following day and billings made in the usual manner.

While the embodiment shown and described in detail herein are fully capable of performing the objects and achieving the advantages desired, the invention is not limited to the specific form, as it will be clear that numerous changes may be made by those skilled in the art without departing from the inventive concept herein disclosed.

I claim:

1. A device of the class described, comprising: a cabinet; a container secured against one wall of said cabinet; a time clock in said cabinet; tray supporting guides in said container; a tray movable on said guides into and out of operative position with said time clock; means for preventing complete withdrawal of said tray; a time card adapted to contain a vehicle lease and key detachably associated with said tray; said time card having laterally extending ears; a card seat formed in said tray conforming to and supporting the outer end of said card for insuring inward movement of said card to said clock; a card storing container below said tray and guides; and mechanism initially permitting inward movement of said card on said tray but automatically resisting rearward movement of said card on said tray and forcing same into said container, said mechanism including ramps, over which said time-card ears pass upon said inward movement of said card, said ears preventing outward movement of said card when said tray is moved backwardly.

2. Apparatus according to claim 1 wherein said time-clock is actuatable by said tray upon inward movement thereof.

References Cited in the file of this patent
UNITED STATES PATENTS

| | | |
|---|---|---|
| 957,083 | Nauck | May 3, 1910 |
| 2,649,352 | Frick | Aug. 18, 1953 |